(12) United States Patent
Holland et al.

(10) Patent No.: US 8,140,318 B2
(45) Date of Patent: Mar. 20, 2012

(54) METHOD AND SYSTEM FOR GENERATING APPLICATION SIMULATIONS

(75) Inventors: Jeffrey W. Holland, Powder Springs, GA (US); Bradley K. Wells, Kennesaw, GA (US)

(73) Assignee: International Business Machines Corporation, Armonk, NY (US)

(*) Notice: Subject to any disclaimer, the term of this patent is extended or adjusted under 35 U.S.C. 154(b) by 715 days.

(21) Appl. No.: 11/841,540

(22) Filed: Aug. 20, 2007

(65) Prior Publication Data
US 2009/0055154 A1    Feb. 26, 2009

(51) Int. Cl.
G06F 9/45    (2006.01)
G09G 5/00    (2006.01)

(52) U.S. Cl. ......... 703/22; 345/650; 345/661; 345/676; 345/689

(58) Field of Classification Search ............ 703/22; 345/650, 661, 676, 689
See application file for complete search history.

(56) References Cited

U.S. PATENT DOCUMENTS 5,261,820 A * 11/1993 Slye et al. ................ 463/1
5,832,212 A * 11/1998 Cragun et al. .............. 726/2
5,996,011 A * 11/1999 Humes .................. 709/225
7,054,799 B1   5/2006 Hartell et al.
7,546,334 B2 * 6/2009 Redlich et al. .......... 709/201
7,669,051 B2 * 2/2010 Redlich et al. .......... 713/166
2002/0171681 A1 * 11/2002 Nomura et al. .......... 345/772
2004/0046792 A1   3/2004 Coste et al.
2005/0132070 A1 * 6/2005 Redlich et al. .......... 709/228

OTHER PUBLICATIONS

"Using Mobile Communications to Assert Privacy from Video Surveillance", Brissal, Jack. HP Laboratories, Princeton, NJ. IPDPS 2005.*
INSPEC: Unsupervised SAR Image Segmentation using Recursive Partitioning, AN-6951895; Venkatachalam, V. et al.; 2000; Proceedings of SPIE—The International Society for Optical Engineering, vol. 4053, Abstract and Proceedings of SPIE; Algorithms for Synthetic Aperture Radar Imagery VII, Apr. 2000, pp. 121-129.
The Kinedit System: Affective Messages Using Dynamic Texts, Forlizzi, J. et al.; 2003. vol. 5, Issue No. 1.
CHI 2006 Proceedings; • Interacting with Large Surfaces; Keepin' It Real: Pushing the Desktop Metaphor with Physics, Piles and the Pen, Agarawala, A. et al.; Apr. 2006.

* cited by examiner

*Primary Examiner* — Paul Rodriguez
*Assistant Examiner* — Nithya Janakiraman
(74) *Attorney, Agent, or Firm* — John R. Pivnichny; Roberts Mlotkowski Safran & Cole, P.C.

(57) ABSTRACT

A method and system for generating application simulations and, more particularly, a method and system for graphical data scrubbing in application simulation image sequences. The method comprises creating a graphical representation of identified data and scrubbing instances of the identified data. The method further comprises replacing the scrubbed identified data with the graphical representation of the identified data. The system includes a computer infrastructure to perform at least the steps of the method.

29 Claims, 6 Drawing Sheets

Personnel no. 99999999
↑
300

Name

EE Group

EE subgroup

METHOD AND SYSTEM FOR GENERATING APPLICATION SIMULATIONS

FIELD OF THE INVENTION

The invention generally relates to providing a method and system for generating application simulations and, more particularly, to a method and system for graphical data scrubbing in application simulation image sequences.

BACKGROUND OF INVENTION

Simulations of software applications are typically created by running special programs referred to as simulation generation software. The simulation generation software is designed to monitor a simulation developer's interaction with another application, e.g., target software, and the changes that result from those interactions. For example, the simulation generation software records a stream of images and events, similar to a movie, of the interactions between the target software and the developer. These interactions can then be replayed to simulate the target software in order to teach a user specific features of the target software. The simulation generation software also allows the simulation developer to modify and enhance the simulation.

Like a movie, the initial simulation is a single path of execution, in which the flow of events follows one possible path through the target software. By way of illustration, a developer may wish to simulate a copy and paste operation for a word processing application. In this example, the developer may perform the following operation, in a single path flow:

(i) Highlight a specific word or words;
(ii) Click on "Edit" and scroll to and highlight "Copy";
(iii) Move the cursor to a desired location; and
(iv) Click on "Edit" and scroll to and highlight "Paste".

During these operations, the simulation generation software will record these actions in a single path, for future playback. Once recorded, the information will be presented to a student, as a simulation, in a single simulation path. In this manner, the student can perform the simulated operations, along with the simulation generation software.

A more sophisticated type of simulation is one with multi-path execution. In this more sophisticated simulation the users of the simulation are allowed to take more than one path of execution through the simulation. Typically, this is referred to as multi-path simulations, which contain options at specific junctions in the simulation that permit branching to a different section of the simulation thereby mimicking a different path in the target software.

By way of example, using the same copy and paste illustration, it is known that there are several different ways in which to accomplish this operation. For example, in addition to the above, the developer may wish to teach the following operation:

(i) Highlight a specific word or words;
(ii) Depress the "Ctrl" and "C" buttons on the keyboard;
(iii) Move the cursor to a desired location; and
(iv) Depress the "Ctrl" and "P" buttons on the keyboard.

However, to generate the multi-path simulation, two or more single path simulations must be manually combined. That is, in the illustrated example, the two simulations must be combined with a branching occurring between the (i) and (ii) operations. Branching to the different sections of the simulation must be manually added to the simulation stream, which is time consuming and tedious. This includes, for example, editing and/or erasing operations, which were recorded when returning back to a beginning point of the two simulations.

In either scenario, often, during the process of creating application simulations, it is necessary that the target software be a "live" system; that is, the target software has real world information such as user information (e.g., user id, password, address, Social Security number, etc.), billing codes, and access information. This is information that is considered confidential; that is, information that the simulation developer does not want the user of the simulation to be exposed to or have knowledge of during the training session. Accordingly, this data must be substituted in the simulation with similar, but fictitious, information.

The problem lies in the fact that the "live" information within the simulation exists not only as expected textual answers to be inputted by the simulation user but also as the graphical representation of that text on the simulations' background. Thus, if a simulation developer is to replace the graphical representation of the text, then the developer must manually create a new graphic matching the characteristics for the graphical representation of the new text (e.g., the text itself with the correct font, font color, background color, etc.) which is very time consuming and tedious. In fact, if during the course of the simulation, a section of the graphical representation of the text is partially obscured, the simulation developer must create another, partial, graphic of the new text and place that new graphic on the required screens.

Accordingly, there exists a need in the art to overcome the deficiencies and limitations described hereinabove.

SUMMARY OF THE INVENTION

In an aspect of the invention, a method comprises creating a graphical representation of identified data and scrubbing instances of the identified data. The method further comprises replacing the scrubbed identified data with the graphical representation of the identified data.

In another aspect of the invention, the method comprises providing a computer infrastructure being operable to: create a graphical representation of identified data; locate all instances of the identified data; scrub all instances and subsets of the identified data; and replace the scrubbed identified data and subsets thereof with the graphical representation of the identified data and subsets thereof.

In another aspect of the invention, a system comprises a server having a database containing data associated with at least entries of a target software and a simulation of the target software. At least one of a hardware and software component searches for instances of identified data in the simulation, scrubs the identified data and replaces the scrubbed identified data with a generated graphical representation of the identified data, which is not the same as the scrubbed identified data.

In yet another aspect of the invention, a computer program product comprises a computer usable medium having readable program code embodied in the medium. The computer program product includes at least one component to: create a graphical representation of identified data; scrub instances of the identified data; and replace the scrubbed identified data with the graphical representation of the identified data.

BRIEF DESCRIPTION OF THE DRAWINGS

FIGS. 3A-6C are graphical representations of exemplary screen shots implementing aspects of the invention.

DETAILED DESCRIPTION OF EMBODIMENTS OF THE INVENTION

The invention generally relates to providing a method and system for generating application simulations and, more particularly, to a method and system for graphical data scrubbing in application simulation image sequences. The method and system is platform independent and thus can be implemented within any database, on a single workstation or provided over a distributed network such as, for example, the Internet and more specifically on the World Wide Web. The method and system of the invention, in one embodiment, allows a simulation developer to scrub confidential or other textual data from the simulation and replace the scrubbed data with more generic graphical representations of the scrubbed data.

In further embodiments, the simulation developer need only know the value of the text and the simulation generation software will create a new graphical representation of the text, determine where it goes throughout the simulation and replace the text with the new graphical representation of the text. The system and method of the invention is also configured to replace subsets of the text within the simulation with graphical representations, perhaps when the text is obscured by a pop-up window. In still further embodiments, the simulation generation will prompt the simulation developer for font characteristics of the text before generating the new graphical representation and placing it on the screens of the simulation.

In embodiments, the system and method of the invention will save simulation developers a large amount of time by not requiring them to use third party software to manually create graphics, import those graphics to the simulation generation software, paste those graphics on individual screens and then move the graphics to match the areas to be replaced. In addition, in embodiments, the system and method of the invention does not require the simulation developer to know how to edit graphics or require the services of graphics artist, thus reducing considerable overhead and costs in the development of simulation software.

In embodiments, the invention provides a business method that performs the process steps of the invention on a subscription, advertising, and/or fee basis. That is, a service provider, such as a Solution Integrator, could offer to provide simulation tools to a user. In this case, the service provider can create, maintain, support, deploy etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Embodiment of System Environment

Figure 1:
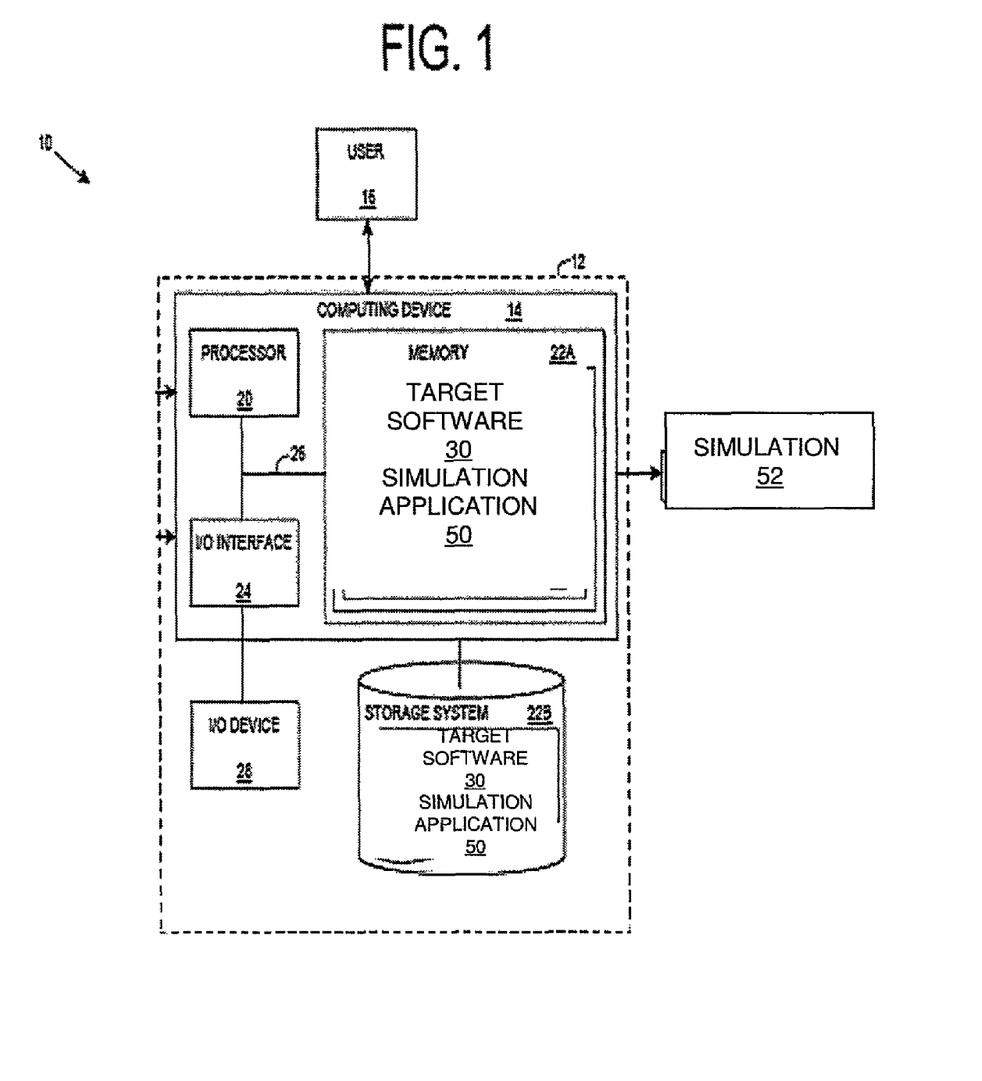
FIG. 1 shows an illustrative environment for implementing the steps in accordance with the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 operable to generate and/or perform the simulation program 50 of the invention, e.g., process described herein.

The computing device 14 is shown including a processor 20, a memory 22A, an input/output (I/O) interface 24, and a bus 26. Further, the computing device 14 is shown in communication with an external I/O device/resource 28 and a storage system 22B. In general, the processor 20 executes computer program code, which is stored in memory 22A and/or storage system 22B. While executing computer program code, the processor 20 can read and/or write data, such as from a target software 30 and the simulation application 50, to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in other embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in one embodiment, the computer infrastructure 12 comprises two or more computing devices (e.g., a server cluster) that communicate over any type of communications link, such as a network, a shared memory, or the like, to perform the process described herein. Further, while performing the processes described herein, one or more computing devices in the computer infrastructure 12 can communicate with one or more other computing devices external to the computer infrastructure 12 using any type of communications link. In either case, the communications link can comprise any combination of various types of wired and/or wireless links; comprise any combination of one or more types of networks (e.g., the Internet, a wide area network, a local area network, a virtual private network, etc.); and/or utilize any combination of various types of transmission techniques and protocols.

As discussed herein, a developer 16 (e.g., user) can input information to the computer infrastructure 12 in order to generate a simulation 52. More specifically, the user can perform multiple operations on the target software, which is then recorded by the simulation application 50 of the invention. In this manner, the simulation application 50 can generate a simulation of the actions performed on the target software. In embodiments of the invention, the method and system of the invention may be provided by a service provider for a fee such as a one-time fee, a subscription basis, etc.

More specifically, in embodiments, by implementing the invention using, for example, the implementation of FIG. 1, operations of a target application and/or software may be recorded to provide a simulation 52, without the need to manually edit the recording. To accomplish such recordings, in embodiments, the methods and system of the invention are configured to scrub certain identified data in the simulation 52 and replace the identified data with generic information. In further embodiments, the methods and system are configured to create new graphical representation of the text, determine where it goes throughout the simulation and replace the expected textual answer with the new graphical representation of the text. Thus, in embodiments, the system and method is configured to:

1. Determine font characteristics;
2. Determine text which needs to be scrubbed, e.g., confidential information such as, for example, billing codes, access information personal information, etc.;
3. Generate new graphical representation of the text, e.g., similar, but fictitious, information; and
4. Replace the new graphical representation throughout the simulation. In embodiments, the system and method of the invention is configured to replace graphical representations, which may be partially obscured by other screen features.

Thus, by implementing the invention, a developer can explicitly designate textual information that needs to be replaced throughout the simulation.

In implementation, the developer designates a single instance of text or graphics which need to be replaced, and the system and method replaces the all instances of the selected text or graphics throughout the simulation, regardless of whether the text or graphic is partially obscured. In addition, in cases of the text or graphics being partially obscured, perhaps by a pop-up window, the developer will not be required to manually edit and replace such text or graphics. Instead, the system and method of the invention is configured to replace subsets (portions) of the text or graphics throughout the simulation, as discussed in more detail below. In any of the scenarios, the system and method eliminates the need for the developer to manually edit (e.g., locate, erase and replace) the selected text which has been recorded or captured when the developer is creating the simulation.

Exemplary Method of Implementing the Invention

Figure 2:
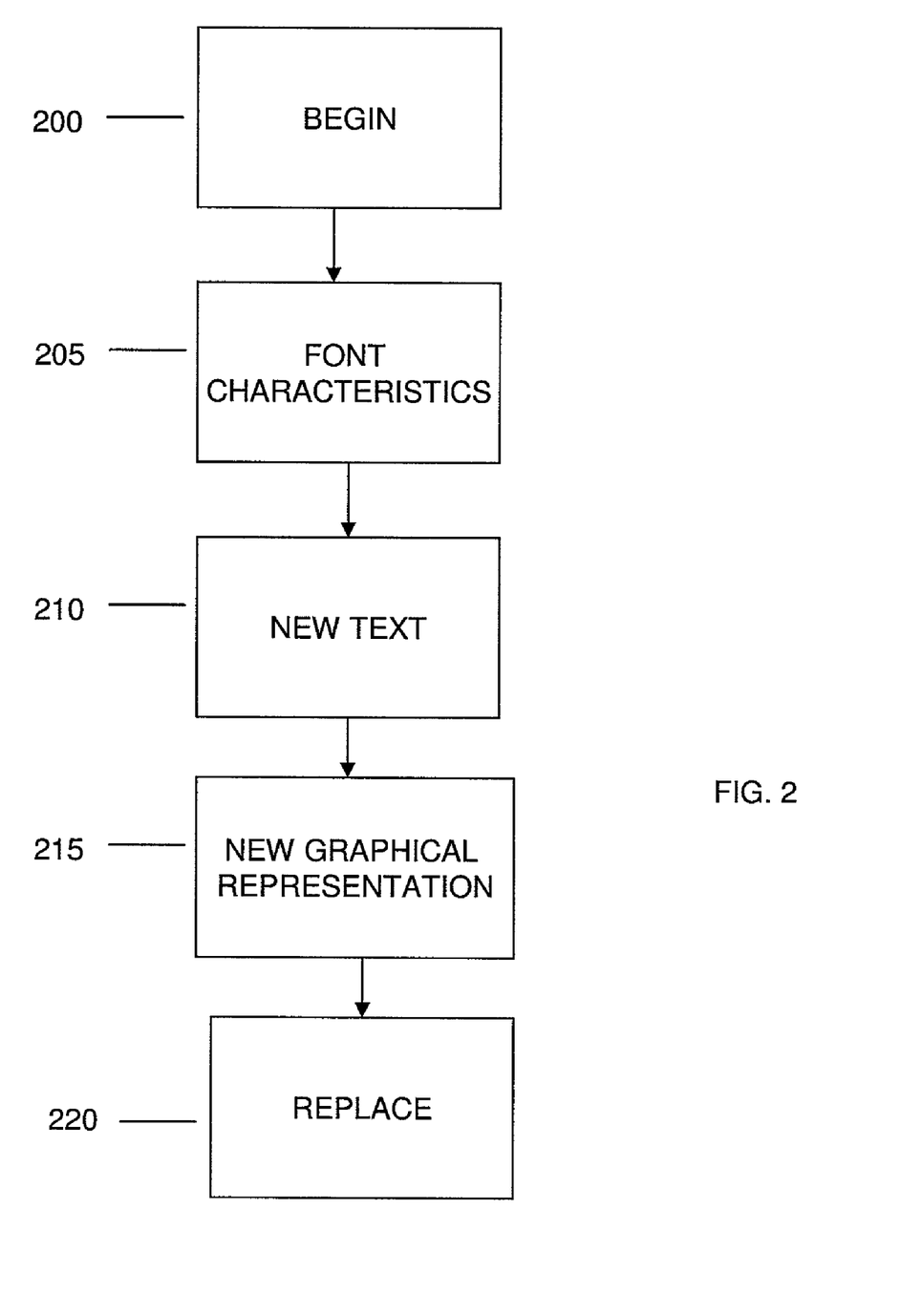
FIG. 2 is a flow chart showing steps implementing an embodiment of the invention.

FIG. 2 is a flow diagram of an embodiment of the invention. FIG. 2 may also be representative of a high-level block diagram, implementing the steps of the invention. The steps of FIG. 2 may be implemented on computer program code in combination with the appropriate hardware such as, for example, implemented and executed from either a server, in a client server relationship, or run on a user workstation with operative information conveyed to the user workstation. In embodiments, the steps of FIG. 2 are implemented on the computer infrastructure of FIG. 1.

The invention can take the form of an entirely hardware embodiment, an entirely software embodiment or an embodiment containing both hardware and software elements. In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Referring back to FIG. 2, at step 200, a developer begins the process by determining the text to be scrubbed from the simulation. This is performed after the developer has simulated events of the target software. At step 205, the process determines the font characteristics (e.g., height, font size, background color, etc.) of the text to be scrubbed. This may be accomplished, for example, through Application Program Interfaces or manual input from the developer. In embodiments, the process may generate random text, using any well known random text generator known to those of skill in the art. At step 210, the developer enters the new text (new graphical representation of the text), which is to replace the selected text (text to be scrubbed). The newly entered information may be similar, but fictitious, information to the selected text. At step 215, using the font information and the newly entered text (text entered by the developer), the process of the invention creates a new graphical representation of the text (e.g., new graphical representation of the text previously entered by the developer which is to replace the selected text). In embodiments, the size of the graphic corresponds to the size of the input area (the edit box), which will be the largest area that gets replaced. At step 220, the text to be scrubbed or a subset of such text is replaced (substituted) throughout the simulation with the new graphical representation of the text.

In embodiments, to accomplish the replacement, the process searches for all instances of the text to be scrubbed, and replaces the text with the new graphical representation of the text. In further embodiments, to ensure that all scenarios are addressed, the area represented by the input area on each screen in the sequence is compared pixel by pixel to the original graphical representation of the text. If a pixel is the same on both the simulation screen and in the original graphical representation, then that pixel is replaced with the corresponding pixel from the new graphical representation. In this manner, the process can identify subsets of the text to be scrubbed and replace this subset with a corresponding subset of the new graphical representation.

Example of Use

The following is an illustrative example implementing the methods and systems of the invention. The example provided herein is not to be considered limiting, and is provided for illustrative purposes to better understand the invention. Thus, additional examples, modes of operation, etc. are contemplated by the invention, as discussed throughout the description. In the example described, for illustrative purposes, the simulation includes an input of a personnel number. The personnel number, and its corresponding graphical representation, is the text which is to be scrubbed and replaced with a new corresponding graphic.

Figure 3A:
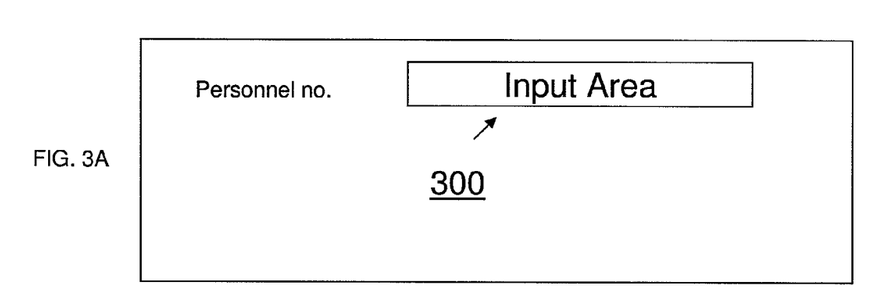

In this example, the simulation developer starts the target software and methods and systems of the invention, e.g., simulation generation apparatus. FIG. 3A shows a screen on which the simulation user enters the personnel number on a target software. This information will be recorded on the simulation. Box 300 represents the input area (e.g., edit box) defined by the simulation developer. It should be understood by those of skill in the art that the input area can be used to provide any information such as, for example, social security number, or any other type of sensitive information. Also, as should now be understood in view of the above description, in embodiments, the input area will be replaced with the new graphical representation. Also, it should be understood that the screen shot of FIG. 3A is representative of a screen shot of a target software application, which is to be used in the simulation.

Figure 3B:
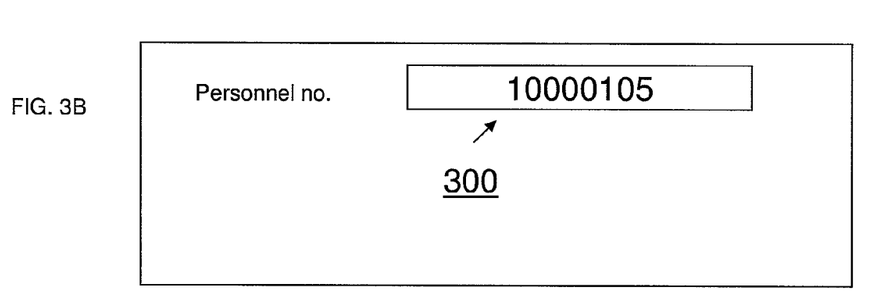
Figure 3C:
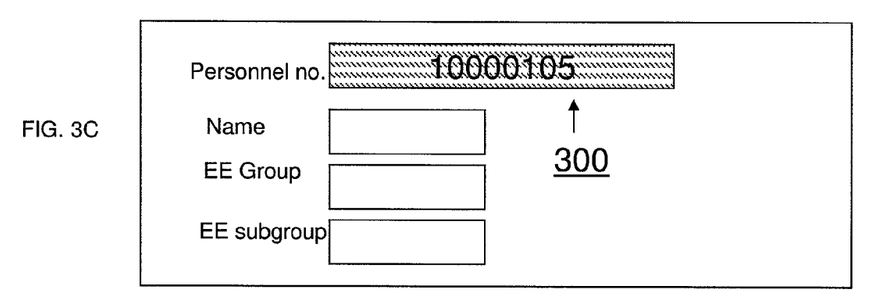

FIG. 3B shows the next screen in the sequence, where the user has entered the personnel number and the simulation has advanced one screen. The entering of the data may be, for example, provided by the simulation developer. FIG. 3C shows a third screen in the sequence. In this sequence, the simulation is advanced to display the personnel data, in addition to other relevant data associated with the simulation and target software. As shown graphically in FIG. 3C, the background color of the input area has changed to indicate that it is out of focus. It should be understood by those of skill in the art that there could be any number of screens in the simulation on which these graphical representations might be present.

As discussed above, some applications will return the font characteristics of text through Application Program Interfaces (APIs). In embodiments, these characteristics are saved at the simulation creation time for later use. For those applications that do not allow the programmatic acquisition of the text properties, the font text color and background color (and other characteristics) can be determined by other mechanisms. For example, prior to inputting any textual information, the process of the invention can determine the pixel in the center of the input area 300 and use this pixel to determine the background color. The text color, on the other hand, can be determined from the screen shot of, for example, FIG. 3B, by choosing the color in the input area 300 which does not match the background color. In embodiments, this can be accomplished by starting with the pixel in the center of the input area 300 and testing pixels to the left and/or right until a pixel of a different color is encountered. This different colored pixel will be the pixel color of the input text. In embodiments, the testing of pixels to the left and right may be tested simultaneously.

In embodiments, the text color, background color, font type and font size are defaulted to values determined through APIs and analysis. For font characters that cannot be determined through APIs, though, the simulation developer is given a prompt (interface) that permits the developer to match the font as closely as possible. This prompt may also be used to specify the new text.

Figure 4:
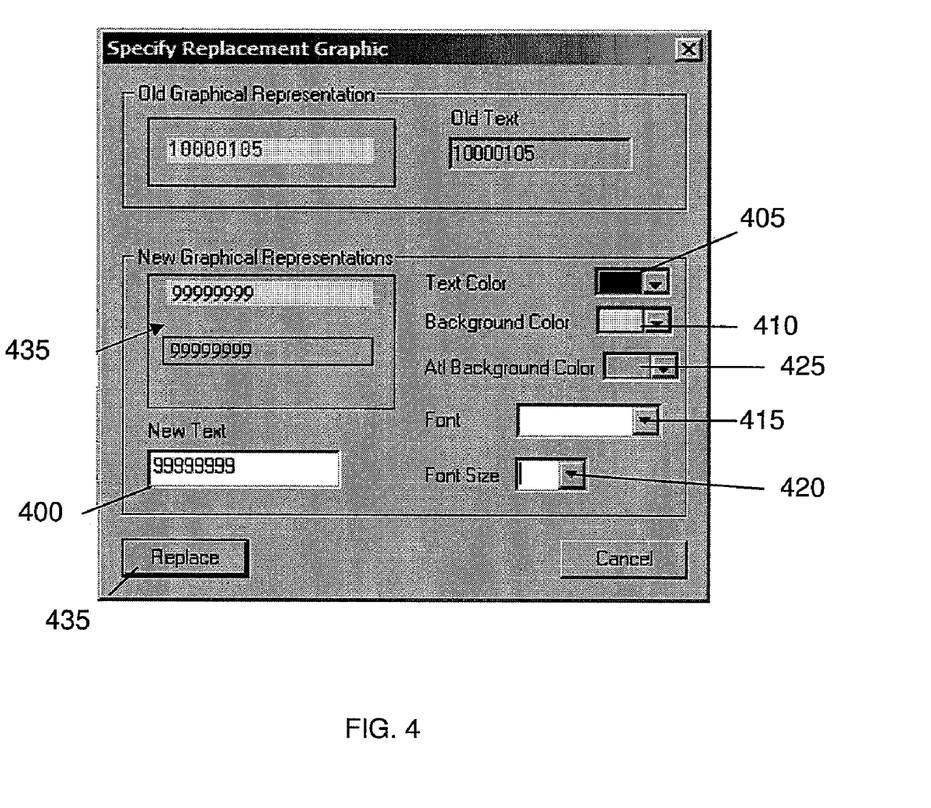

For example, FIG. 4 shows a dialog box which includes for example, input areas for "New Text," 400, "Text Color," 405, "Background Color," 410, font type 415, font size 420 and alternative background color 425. In embodiments, as the text or characteristics thereof change, the text in the "New Graphical Representation" box 430 also changes. In the example of FIG. 4, the simulation developer has changed the personal number to "99999999" and the font color to blue. To effectuate the change, the developer will press the Replace button 435. The prompt may also include the original text (old text) and the original graphical representation which is to be replaced by the new graphical representation.

Figure 5:
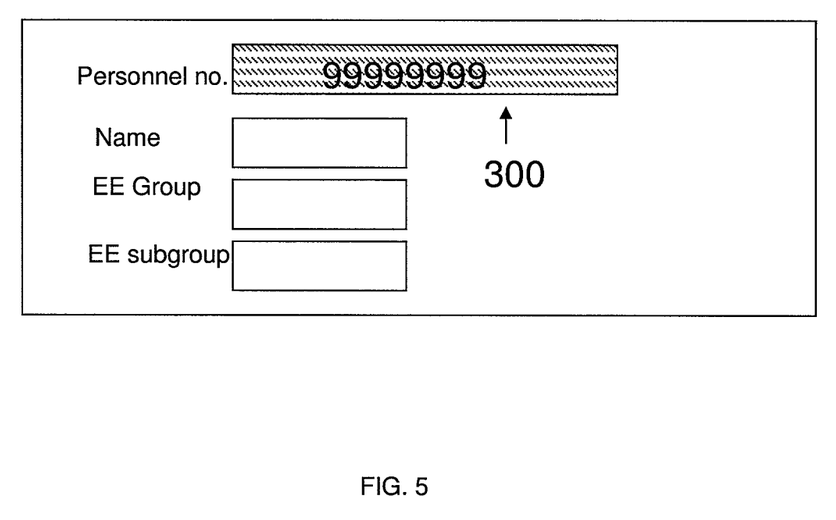

As discussed above, using the font information and the new text entered, the simulation generation creates a new graphical representation of the text. The size of the graphic corresponds to the size of the input area (the edit box), which is preferably the largest area that gets replaced. Once the new graphical representation is generated, the simulation is searched to determine where the text to be scrubbed should be replaced with the new graphic representation. FIG. 5 shows the substitute of the text from "10000105" (See, FIG. 3C) to "99999999". The representation of FIG. 5 shows the largest area to be replaced (the entire non-obscured input area).

Figure 6A:
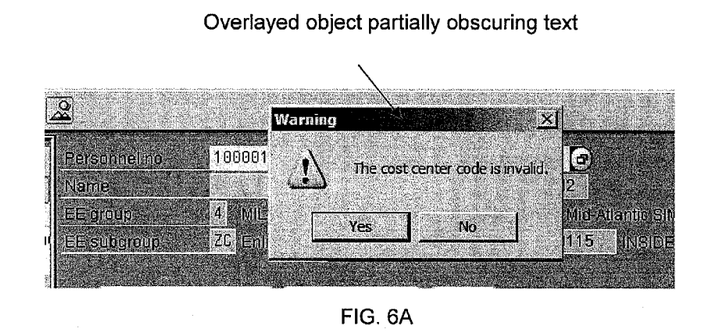
Figure 6B:
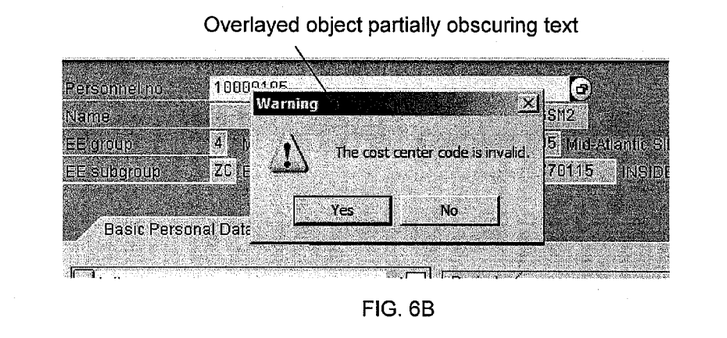

The system is robust enough to not only replace the entire original graphic, but also any subset of the graphic, where a subset of the original graphic is replaced in instances where sections of the original graphic have been obscured, perhaps by a pop up window, as shown in FIGS. 6A and 6B. By way of one non-limiting contemplated example, to ensure that all scenarios are addressed, the area represented by the input area on each screen in the sequence is compared pixel by pixel to the original graphical representation of the text. If a pixel is the same on both the screen and in the original graphical representation, the process will replace that pixel with the corresponding pixel from the new graphical representation.

Figure 6C:
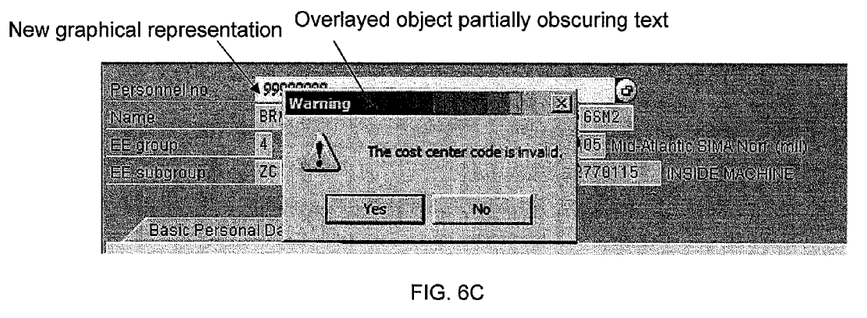

In one example, for every pixel that lies within the box of the input area, the pixel color is compared to the color of a corresponding pixel in the original graphical representation. If the pixels are the same, the process will replace the pixel on the current screen with the pixel from the new graphical representation. In this way, subsets of the text to be scrubbed can be detected and replaced as shown in FIG. 6C. Thus, the process takes into account other graphics that might be overlayed with the text to be scrubbed. The overlayed box or portions thereof, on the other hand, no longer need to be replaced.

By using the methods and systems of the invention, the developer no longer has to edit the simulation manually. Instead, the methods and system of the invention automatically replace the text to be scrubbed. Thus, in implementation, when the developer is desirous of changing certain text, there is no need to edit, e.g., find, erase and replace, each instance of the text.

While the invention has been described in terms of embodiments, those skilled in the art will recognize that the invention can be practiced with modifications and in the spirit and scope of the appended claims.

What is claimed is:

1. A method comprising:
  recording an image sequence of actions performed on a target software;
  determining original identified data to be scrubbed from the recorded image sequence;
  determining an original graphical representation of the original identified data;
  determining new identified data that is to replace the original identified data;
  creating a new graphical representation of the new identified data;
  locating and scrubbing instances in the recorded image sequence that match the original graphical representation of the original identified data;
  replacing the scrubbed instances with the new graphical representation of the new identified data; and
  finding a text color of the original graphical representation of the original identified data, comprising starting with a pixel in a center of an input area and testing pixels on either or both sides until a pixel of a color different from a background color of the original graphical representation is encountered.

2. The method of claim 1, further comprising:
  identifying subsets in the recorded image sequence that match at least one section of the original graphical representation of the original identified data;
  scrubbing the subsets; and
  replacing the scrubbed subsets with corresponding subsets of the new graphical representation of the new identified data.

3. The method of claim 1, wherein subsets in the recorded image sequence that match at least one section of the original graphical representation of the original identified data comprise at least one section of one of the instances, the one of the instances obscured with an object.

4. The method of claim 1, further comprising:
identifying font characteristics of the original graphical representation of the original identified data and the background color of the original graphical representation of the original identified data; and
searching the recorded image sequence to determine all instances in the recorded image sequence that match the original graphical representation of the original identified data.

5. The method of claim 1, wherein each of the original and the new identified data is at least textual data.

6. The method of claim 1, further comprising randomly generating text which is represented by the new graphical representation of the new identified data.

7. The method of claim 1, wherein the steps of claim 1 are platform independent.

8. The method of claim 1, wherein the steps of claim 1 are provided by a provider which at least one of creates, maintains, deploys and supports a computer infrastructure that performs the steps of claim 1.

9. The method of claim 1, wherein a single instance in the recorded image sequence that matches the original graphical representation of the original identified data is selected, and all instances in the recorded image sequence that match the original graphical representation of the original identified data are replaced with the new graphical representation of the new identified data.

10. The method of claim 1, wherein the new graphical representation of new identified data is created from text entered by a developer.

11. The method of claim 1, wherein a size of the new graphical representation of the new identified data corresponds to a size of the input area of the target software, which is a largest area that will be replaced, and a subset in the recorded image sequence that matches at least one section original graphical representation of the original identified data is smaller than the input area.

12. The method of claim 1, further comprising comparing pixel by pixel the original graphical representation of the original identified data with each image of the recorded image sequence, and when a pixel on the image is the same as a corresponding pixel from the original graphical representation, replacing the pixel on the image with a corresponding pixel from the new graphical representation of the new identified data.

13. The method of claim 1, wherein font characteristics are saved at a creation time of the recorded image sequence for later use.

14. The method of claim 1, further comprising providing a dialog to permit matching data characteristics between the original graphical representation of the original identified data and the new graphical representation of the new identified data.

15. The method of claim 1, further comprising determining a text color of the new graphical representation, a background color of the new graphical representation, an alternative background color of the new graphical representation, a font of the new graphical representation, and a font size of the new graphical representation, wherein:
the new identified data, the text color, the background color, the alternative background color, the font, and the font size are provided by the user via a prompt;
the creating of the new graphical representation is based on the new identified data, the text color, the background color, the alternative background color, the font, and the font size; and
the recorded image sequence comprises a video simulation of the actions performed on the target software.

16. A method comprising:
recording an image sequence of actions performed on a target software;
determining original identified data to be scrubbed from the recorded image sequence;
determining an original graphical representation of the original identified data;
determining new identified data that is to replace the original identified data;
creating a new graphical representation of the new identified data;
locating and scrubbing instances in the recorded image sequence that match the original graphical representation of the original identified data;
replacing the scrubbed instances with the new graphical representation of the new identified data;
determining a background color of the original graphical representation of the original identified data by determining a center pixel color in an input area; and
determining a text color of the original graphical representation of the original identified data by finding a color in the input area which does not match the background color,
wherein finding the text color comprises starting with a pixel in a center of the input area and testing pixels on either or both sides until a pixel of a color different from the background color is encountered.

17. A method, comprising:
providing a computer infrastructure being operable to:
record an image sequence of actions performed on a target software;
determine original identified data to be scrubbed from the recorded image sequence;
determine an original graphical representation of the original identified data;
determine new identified data that is to replace the original identified data;
create a new graphical representation of new identified data;
locate all instances in the recorded image sequence that match the original graphical representation of the original identified data;
locate all subsets in the recorded image sequence that match at least one section of the original graphical representation of the original identified data;
scrub all of the instances and the subsets;
replace the scrubbed instances and subsets thereof with the new graphical representation of the new identified data and corresponding subsets of the new graphical representation of the new identified data thereof; and
find a text color of the original graphical representation of the original identified data, comprising starting with a pixel in a center of an input area and testing pixels on either or both sides until a pixel of a color different from a background color of the original graphical representation is encountered.

18. The method of claim 17, wherein the computer infrastructure is further operable to determine characteristics of the original graphical representation of the original identified data and match the new graphical representation of the new identified data to the characteristics.

19. The method of claim 17, wherein the computer infrastructure is further operable to generate random text which is representative of the new graphical representation of the new identified data.

20. The method of claim 17, wherein the computer infrastructure is further operable to determine a size of the input area, which is the largest size that will be replaced with the new graphical representation of the new identified data, and the subset is smaller than the size of the input area.

21. The method of claim 17, wherein the computer infrastructure is further operable to search for all instances in the recorded image sequence that match the original graphical representation of the original identified data.

22. The method of claim 21, wherein the search is a pixel by pixel comparison between the original graphical representation of the original identified data and each image of the recorded image sequence.

23. The method of claim 17, wherein the steps of claim 17 are performed on at least one of a subscription, advertising and fee basis.

24. The method of claim 17, wherein:
the computer infrastructure is further operable to determine a text color of the new graphical representation, a background color of the new graphical representation, an alternative background color of the new graphical representation, a font of the new graphical representation, and a font size of the new graphical representation;
the new identified data, the text color, the background color, the alternative background color, the font, and the font size are provided by the user via a prompt;
the creating of the new graphical representation is based on the new identified data, the text color, the background color, the alternative background color, the font, and the font size; and
the recorded image sequence comprises a video simulation of the actions performed on the target software.

25. A system comprising:
a server comprising:
a database containing data associated with at least entries of a target software and a recorded image sequence of actions performed on the target software; and
at least one of a hardware and software component operable to:
determine original identified data to be scrubbed from the recorded image sequence;
determine an original graphical representation of the original identified data;
determine new identified data that is to replace the original identified data;
create a new graphical representation of the new identified data;
search for instances in the recorded image sequence that match the original graphical representation of the original identified data;
scrub the instances;
replace the scrubbed instances with the generated new graphical representation of the new identified data, which is not the same as the scrubbed instances; and
find a text color of the original graphical representation of the original identified data, comprising starting with a pixel in a center of an input area and testing pixels on either or both sides until a pixel of a color different from a background color of the original graphical representation is encountered.

26. The system of claim 25, wherein the at least one of a hardware and software component is operable to:
identify characteristics of the original graphical representation of the original identified data;
identify the characteristics based on a pixel by pixel analysis; and
identify subsets in the recorded image sequence that match at least one section of the original graphical representation of the original identified data, scrub the subsets, and replace the subsets with corresponding subsets of the generated new graphical representation of the new identified data.

27. The system of claim 25, wherein:
the at least one of a hardware and software component is further operable to determine a text color of the new graphical representation, a background color of the new graphical representation, an alternative background color of the new graphical representation, a font of the new graphical representation, and a font size of the new graphical representation;
the new identified data, the text color, the background color, the alternative background color, the font, and the font size are provided by the user via a prompt;
the creating of the new graphical representation is based on the new identified data, the text color, the background color, the alternative background color, the font, and the font size; and
the recorded image sequence comprises a video simulation of the actions performed on the target software.

28. A computer program product comprising a memory having readable program code embodied in the memory, the computer program product includes at least one component operable to:
record an image sequence of actions performed on a target software;
determine original identified data to be scrubbed from the recorded image sequence;
determine an original graphical representation of the original identified data;
determine new identified data that is to replace the original identified data;
create a new graphical representation of the new identified data;
locate and scrub instances in the recorded image sequence that match the original graphical representation of the original identified data;
replace the scrubbed instances with the new graphical representation of the new identified data; and
find a text color of the original graphical representation of the original identified data, comprising starting with a pixel in a center of an input area and testing pixels on either or both sides until a pixel of a color different from a background color of the original graphical representation is encountered.

29. The computer program product of claim 28, wherein:
the at least one component is further operable to determine a text color of the new graphical representation, a background color of the new graphical representation, an alternative background color of the new graphical representation, a font of the new graphical representation, and a font size of the new graphical representation;
the new identified data, the text color, the background color, the alternative background color, the font, and the font size are provided by the user via a prompt;

the creating of the new graphical representation is based on the new identified data, the text color, the background color, the alternative background color, the font, and the font size; and the recorded image sequence comprises a video simulation of the actions performed on the target software.

* * * * *